United States Patent
Awada et al.

(10) Patent No.: US 7,006,817 B2
(45) Date of Patent: Feb. 28, 2006

(54) SYSTEM AND METHOD FOR MITIGATING THE MOBILE PHONE NUISANCE FACTOR

(75) Inventors: Faisal M. Awada, Round Rock, TX (US); Joe Nathan Brown, Austin, TX (US); Victor Espinoza, Jr., Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 533 days.

(21) Appl. No.: 09/998,395

(22) Filed: Nov. 15, 2001

(65) Prior Publication Data

US 2003/0092428 A1 May 15, 2003

(51) Int. Cl.
*H04M 1/68* (2006.01)

(52) U.S. Cl. .................... 455/411; 455/421; 455/455

(58) Field of Classification Search ............. 455/414.1, 455/414.2, 414.3, 432.1, 432.2, 432.3, 434, 455/1, 411, 565, 456.4
See application file for complete search history.

(56) References Cited

U.S. PATENT DOCUMENTS

| | | | |
|---|---|---|---|
| 6,317,594 B1 * | 11/2001 | Gossman et al. | 455/414.1 |
| 6,343,213 B1 * | 1/2002 | Steer et al. | 455/411 |
| 6,377,795 B1 * | 4/2002 | Bach et al. | 455/417 |
| 6,393,272 B1 * | 5/2002 | Cannon et al. | 455/413 |
| 6,421,544 B1 * | 7/2002 | Sawada | 455/565 |
| 6,687,497 B1 * | 2/2004 | Parvulescu et al. | 455/420 |
| 6,760,581 B1 * | 7/2004 | Dutta | 455/414.1 |

* cited by examiner

*Primary Examiner*—Fan Tsang
*Assistant Examiner*—Gerald Gauthier
(74) *Attorney, Agent, or Firm*—Duke W. Yee; Mark E. McBurney; James O. Skarsten

(57) ABSTRACT

The present invention provides a method, apparatus, and computer implemented instructions for mitigating the mobile phone nuisance factor. The present invention causes a mobile phone to activate an "In-Public-Use" profile when in a public establishment, which has a policy for mobile phone usage. A transmitter in the public establishment broadcasts an external control signal that contains an encoded command. The circuitry, or processor instructions, in a mobile phone decodes the command and activates the profile with the identified settings from the command. When the profile is activated, an icon is displayed indicating that the profile is active. Additionally, the "In-Public-Use" profile is deactivated when the mobile phone leaves the range of the signal and the previous settings of the mobile phone are enabled.

23 Claims, 3 Drawing Sheets

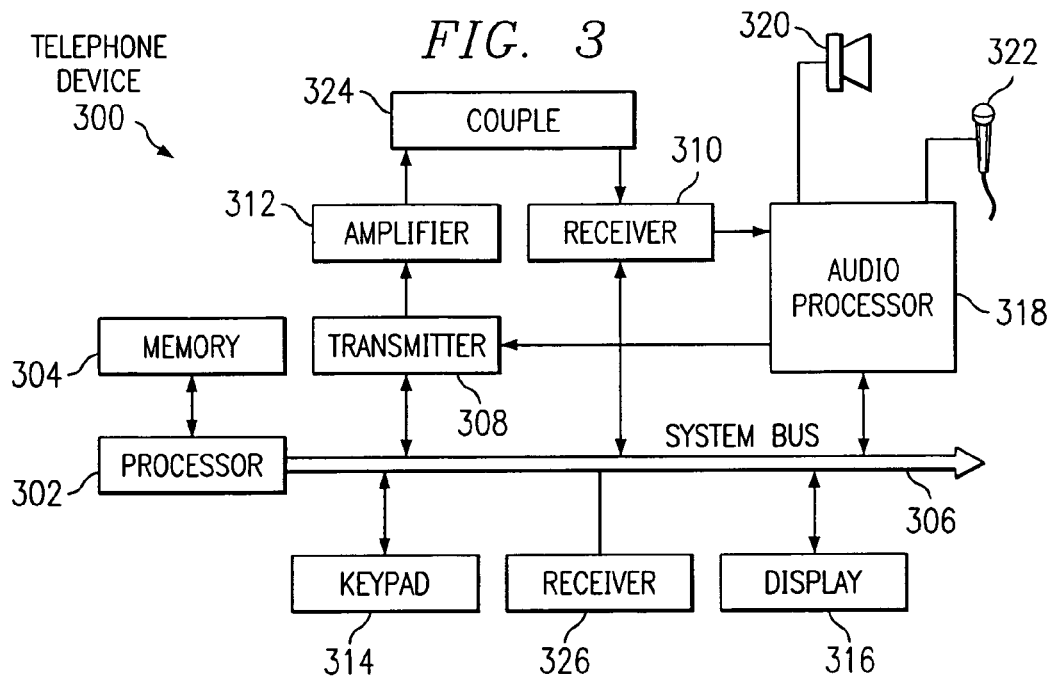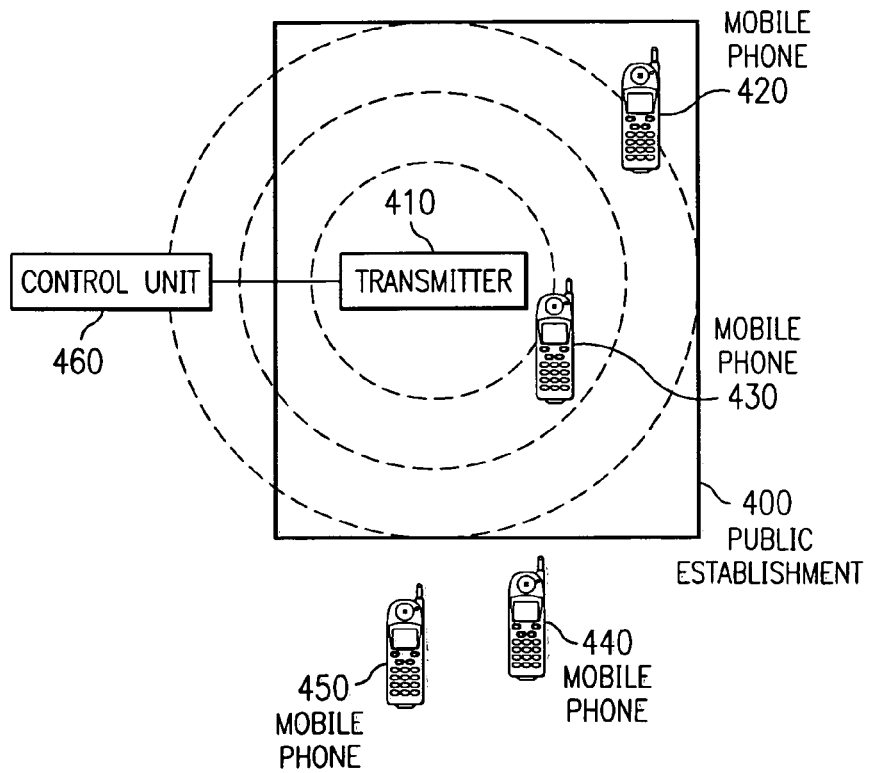

SYSTEM AND METHOD FOR MITIGATING THE MOBILE PHONE NUISANCE FACTOR

BACKGROUND OF THE INVENTION

1. Technical Field

The present invention relates to an improved data processing system. In particular, the present invention relates to a method, apparatus, and computer instructions for mitigating the mobile phone nuisance factor.

2. Description of Related Art

Mobile phone systems refer to communications systems, especially the Advance Mobile Phone Service (AMPS) that divide a geographic region into sections, called cells. The purpose of this division is to make the most use out of a limited number of transmission frequencies. Each connection, or conversation, requires its own dedicated frequency, and the total number of available frequencies is about 1,000. To support more than 1,000 simultaneous conversations, mobile systems allocate a set number of frequencies for each cell. Two cells can use the same frequency for different conversations so long as the cells are not adjacent to each other.

For digital communications, several competing mobile systems exist, including Global System for Mobile Communications (GSM) and Code-Division Multiple Access (CDMA).

GSM is one of the leading digital mobile systems. GSM uses narrowband Time Division Multiple Access (TDMA), which allows eight simultaneous calls on the same radio frequency. GSM was first introduced in 1991. As of the end of 1997, GSM service was available in more than 100 countries and has become the standard in Europe and Asia.

CDMA is a digital mobile technology that uses spread-spectrum techniques. Unlike competing systems, such as GSM, that use TDMA, CDMA does not assign a specific frequency to each user. Instead, every channel uses the full available spectrum. Individual conversations are encoded with a pseudo-random digital sequence. CDMA is a military technology first used during World War II by the English allies to foil German attempts at jamming transmissions. The allies decided to transmit over several frequencies, instead of one, making it difficult for the Germans to pick up the complete signal.

Mobile phones have proven to be a very beneficial tool for people to exchange information when away from the home or office. At the same time mobile telephones are becoming a public nuisance due to the phones ringing in inappropriate places and people holding conversations on the phones in places such as theatres and restaurants.

One solution to mobile phone nuisance is a jamming device for mobile phone signals that disrupts the reception of the signal at the mobile phone, making it impossible to receive service from the mobile network. These devices have been used in Japan and other places. A permit is usually required in order to used this device and it is currently illegal to use such a device in the U.S. When this device is used, functions such as Short Messaging Service (SMS), email, Internet access, and mailbox access are all disabled.

Therefore, it would be advantageous to have an improved method, apparatus, and computer instructions for enforcing a policy governing the operation of mobile phones when located in a public establishment or a public space.

SUMMARY OF THE INVENTION

The present invention provides a method, apparatus, and computer implemented instructions for mitigating the mobile phone nuisance factor. The present invention causes a mobile phone to activate an "In-Public-Use" profile when in a public establishment, which has a policy for mobile phone usage. A transmitter in the public establishment broadcasts an external control signal that contains an encoded command. The circuitry, or processor instructions, in a mobile phone decodes the command and activates the profile with the identified settings from the command. When the profile is activated, an icon is displayed indicating that the profile is active. Additionally, the "In-Public-Use" profile is deactivated when the mobile phone leaves the range of the signal and the previous settings of the mobile phone are enabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram of a telephone device that may be implemented in accordance with a preferred embodiment of the present invention;

FIG. 4 is a block diagram illustrating a method to mitigate the mobile phone nuisance factor in accordance with a preferred embodiment of the present invention;

DETAILED DESCRIPTION OF THE PREFERRED EMBODIMENT

Figure 1:
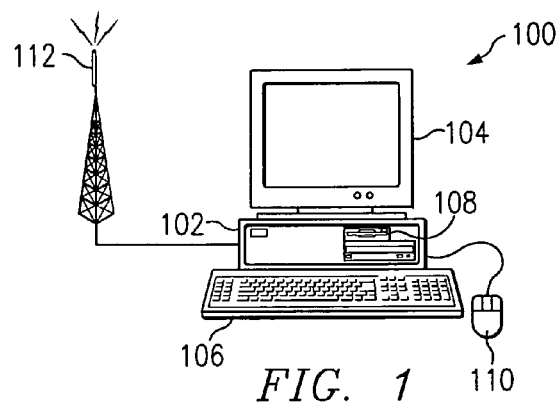
FIG. 1 depicts a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touch pad, touch screen, trackball, microphone, and the like. Computer 100 is connected to transmitter 112, which may transmit signals used to activate profiles to mitigate nuisances from mobile phones. The control of the transmission of the signal is provided through computer 100 in these examples.

Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
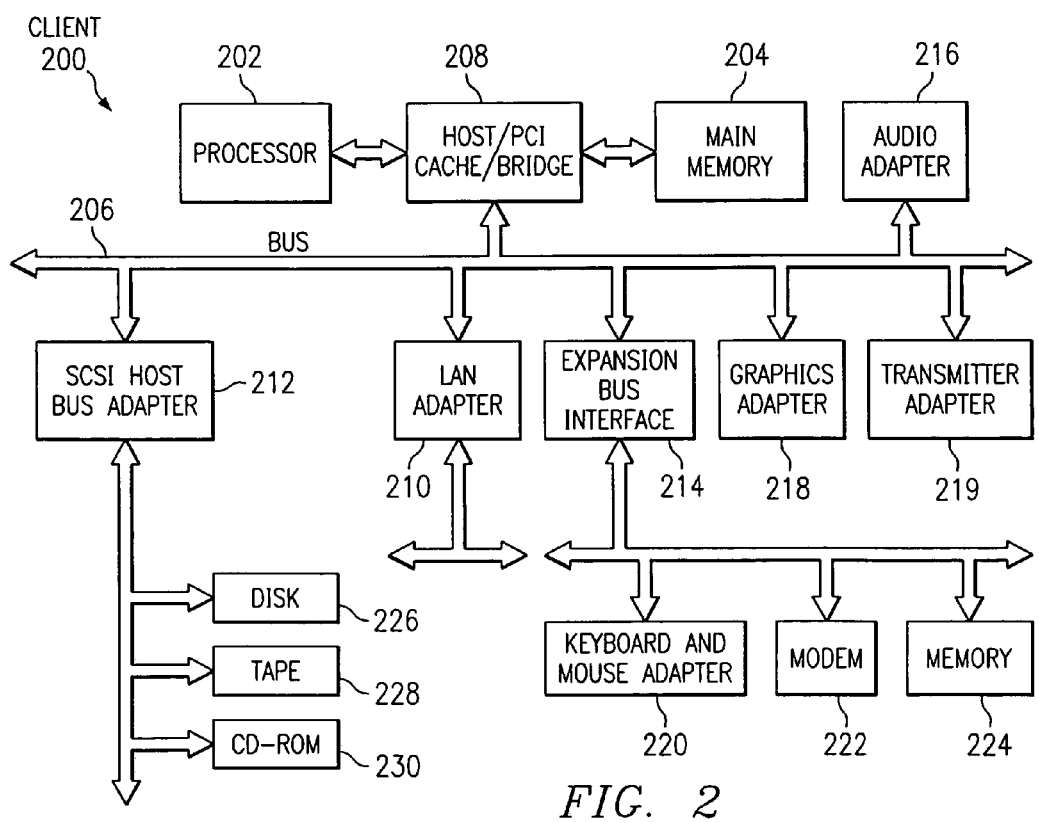
FIG. 2 is a block diagram of a data processing system that may be implemented in accordance with a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located.

Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and transmitter adapter 219 are connected to PCI local bus 206 by add-in boards inserted into expansion slots. Transmitter adapter 219 may be used to control transmissions of signals from a transmitter, such as transmitter 112 in FIG. 1.

Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. Instructions for the operating system and applications or programs are located on storage devices, such as hard disk drive 226, and may be loaded into main memory 204 for execution by processor 202. These instructions may include programs or other code used to control transmissions for managing profiles in mobile phones, such as those transmitted by transmitter 112 in FIG. 1.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

With reference now to FIG. 3, a block diagram of a hardware configuration of a telephone device is depicted in accordance with a preferred embodiment of the present invention. Telephone device 300 includes a processor 302 for controlling operation of the telephone device and a memory 304. The processor may be a general-purpose microprocessor operating under the control of instructions stored a memory, such as memory 304, or device-specific circuitry for controlling the operation of the telephone device. Processor 302 is connected by system bus 306 to transmitter 308, receiver 310, keypad 314, display 316, and audio processor 318.

Transmitter 308 and receiver 310 are coupled to a telephone signal by couple 324 to provide full duplex communication. Audio processing circuit 318 provides basic analog audio outputs to speaker 320 and accepts analog audio inputs from microphone 322. Received signals demodulated and decoded by receiver 310. Transmitter 308 encodes and modulates signals passed to it by processor 302 or audio processor 318. The output of the transmitter is amplified by power amplifier 312 to control the power level at which the signal is transmitted.

Processor 302 or audio processor 318 may detect audible call status information and call status codes received by receiver 310. Memory 304 may include a look-up table associating call status information or call status codes with visual call status information, such as text messages. Processor 302 detects or receives a call status code and displays an appropriate call status message on display 316. Receiver 326 decodes the encoded command transmitted in the signal of the present invention for presentation to processor 302. This receiver may receive different types of signals depending on the implementation. For example, the signals may be infrared, untrasonic, or radio frequency. Alternatively, the decoding function implemented in receiver 326 may be located in receiver 310 to receive and decode this control signal.

Those of ordinary skill in the art will appreciate that the hardware depicted in FIG. 3 may vary.

FIG. 4 is a block diagram illustrating a method to mitigate the mobile phone nuisance factor in accordance with a preferred embodiment of the present invention.

To implement the present invention in these examples, mobile phones will be designed with a factory programmed "In-Public-Use" profile and means for external activation of the profile. This profile will control the behavior of the mobile phone in public places. For example, public establishment 400 contains transmitter 410, which broadcasts a constant signal. The signal contains an encoded command that can activate the "In-Public-Use" profiles in mobile phones. For example, mobile phones 420 and 430 enter the range of the signal and the "In-Public-Use" profiles of these phones are activated when the circuitry, or processor instructions, of the mobile phones decode the signal.

When activated, the profile can control the attributes of the mobile phone, such as the ringer, conversation mode, conversation duration, and informational messages. The ringer can be shut off, set to its minimum volume, set to a non-auditable mode, such as vibrate, or the duration of the ring can be limited. The conversation mode can be enabled or disabled so that a call between parties cannot be accomplished. If the "In-Public-Use" profile has been activated in the no conversation mode, it would still allow emergency calls to be placed. Certain numbers such as 911 would be designated as emergency numbers. The duration of a call can also be limited to some preset amount of time, such as 30 seconds. Additionally, a display message, stating that the use of a mobile phone is prohibited in the establishment, could be displayed on the phone.

The "In-Public-Use" profile cannot be activated or modified by the user of the mobile phone according to a preferred embodiment of the present invention. Although depending on the implementation, these profiles may be changed by a user or other authorized person. The profile is activated in the mobile phone when it is in the presence of an external control signal, such as a radio frequency, infrared, ultrasonic, or other control signal. The control signal is generated by a transmitter, such as transmitter 410, which is located in a public establishment, such as a theater or restaurant. The signal is localized in nature so that it only affects the mobile phone usage in that public place. The signal may be broadcasted within the structure of the public establishment or may include areas outside the structure such as the parking lot of the public establishment. Additionally, areas within the public structure may not broadcast the signal so that the phones may be used as desired in that area. The mechanism of the present invention would allow the establishment to set aside a special area where the control signal is not present thereby allowing normal use of mobile phones in that area analogous to a smoking area in a restaurant.

Receiver 326 in telephone device 300 of FIG. 3 may be used to receive the control signal transmitted from transmitter 410.

The control signal will have the capability to select various settings of the profile to reflect the policy desired in that public place. The signal contains an encoded command, which can be decoded by the circuitry, or processor instructions, of the mobile phones in the present invention. Control unit 460 has the ability to program the control signal that is broadcasted by transmitter 410. The control unit of the present invention may be a data processing system, such as data processing system 200 in FIG. 2, a black box, or any other type of control unit capable of programming the control signal for the transmitter.

When the mobile phone is out of range of the control signal it will revert back to its previous mode of operation. For example, mobile phones 440 and 450 are outside the range of the control signal and would not have the "In-Public-Use" profile activated. If mobile phones 420 and 430 leave the range of the control signal in the public establishment, these mobile phones would return to their previous mode of operation.

Mobile phones 420, 430, 440, and 450 may be, for example, telephone devices, such as telephone device 300 in FIG. 3. Those of ordinary skill in the art will appreciate that the hardware of the present invention may vary. The mechanism of the present invention may be applied to any mobile communications device depending on the particular implementation.

Figure 5A:
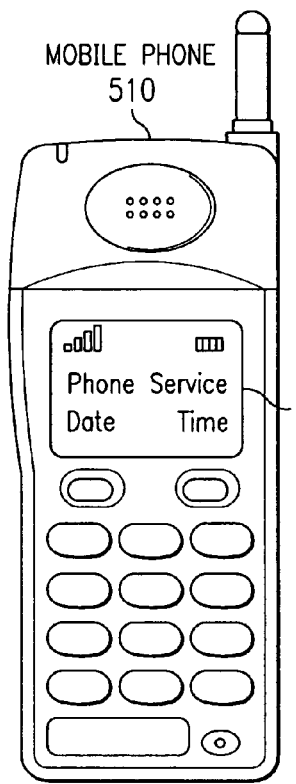
FIGS. 5A–5C display block diagrams of three mobile phones in accordance with a preferred embodiment of the present invention.
Figure 5B:
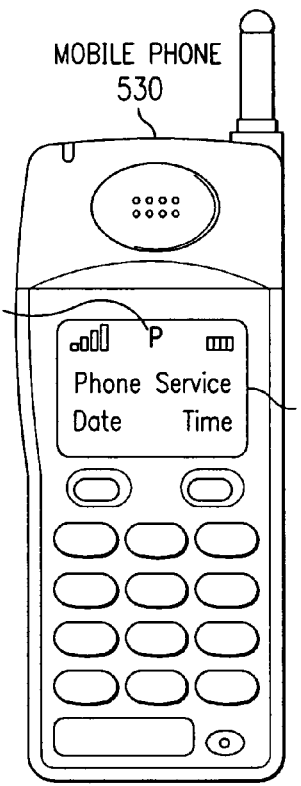
Figure 5C:
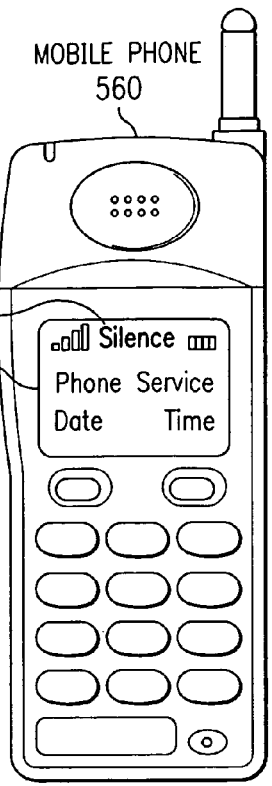

Turning to FIGS. 5A–5C, block diagrams of three mobile phones are displayed in accordance with a preferred embodiment of the present invention.

FIG. 5A shows mobile phone 510 with display 520. Display 520 is a typical display for mobile phones, such as mobile phones 440 and 450 in FIG. 4, prior to entering a location with a policy for mobile phone usage.

FIG. 5B illustrates mobile phone 530 with display 540. If mobile phones, such as mobile phones 420 and 430 in FIG. 4, enter a public establishment broadcasting an external control signal to enforce its policy for mobile phone usage, an "In-Public-Use" icon, such as icon 550, may be displayed. When the profile is activated, the mobile phone will display an icon that indicates that the "In-Public-Use" profile is activated.

FIG. 5C illustrates mobile phone 560 with display 570. Mobile phone 560 displays icon 580, which is another example of an icon that may be displayed while the mobile phone is within the range of the external control signal that activates the "In-Public-Use" profile.

The icon discussed in the present invention may include text or graphics, and may vary with each implementation of the present invention.

Figure 6:
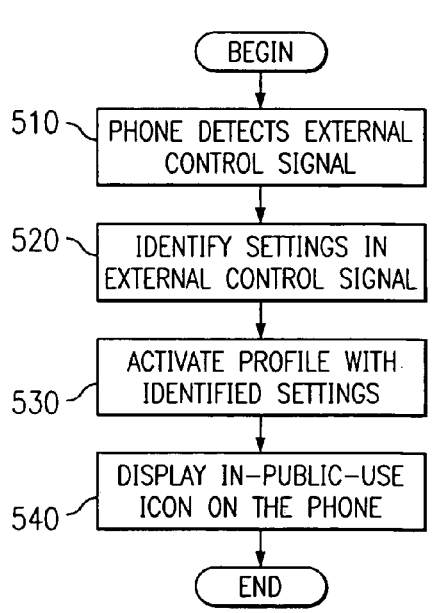
FIG. 6 is a flowchart of the process for a mobile phone entering a public establishment in accordance with a preferred embodiment of the present invention.

FIG. 6 is a flowchart of the process for a mobile phone entering a public establishment in accordance with a preferred embodiment of the present invention. This process may be implemented in a mobile phone, such as telephone device 300 in FIG. 3.

The process begins when a mobile phone enters a public establishment with a policy for mobile phone usage and the mobile phone detects the external control signal, which is constantly broadcasted within the public establishment (step 610). The process identifies the settings in the external control signal by decoding the command in the signal (step 620). The "In-Public-Use" profile of the mobile phone is activated with the identified settings (step 630). The "In-Public-Use" icon is displayed on the mobile phone (step 640) with the process terminating thereafter.

Figure 7:
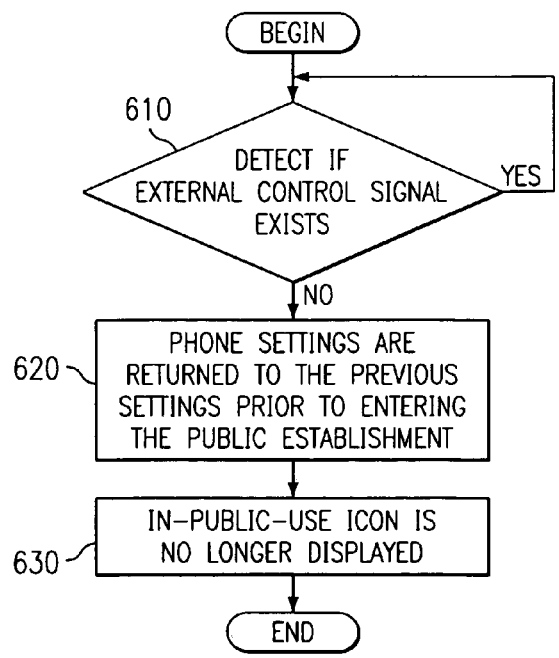
FIG. 7 is a flowchart of the process for a mobile phone exiting a public establishment in accordance with a preferred embodiment of the present invention.

FIG. 7 is a flowchart of the process for a mobile phone exiting a public establishment in accordance with a preferred embodiment of the present invention. This process may be implemented in a mobile telephone, such as telephone device 300 in FIG. 3.

A determination is made as to whether an external control signal exists (step 710). This step is used to determine whether to continue to use the "In-Public-Use" profile. If the external control signal exists, the process returns to step 710. This condition means that the mobile phone is still within range of the transmitter and the profile should continue to be active. If the external signal does not exist, the mobile phone settings are returned to the previous settings prior to entering the public establishment with a policy for mobile phone usage (step 720). The "In-Public-Use" icon is no longer displayed (step 730) with the process terminating thereafter.

The present invention presents a way for a public establishment to set a policy governing the operation of mobile phones when located in a public establishment or a public space. It provides advantages and flexibility in the way the mobile phone nuisance problem is handled. Email, SMS, mailbox, and Internet access are still possible with the implementation of the present invention. The present invention allows for an area where normal mobile phone use is possible and for emergency calls to be made in any location. The present invention is configurable, since the location using the present invention can modify the profile to have different behaviors. For example, one public establishment may only desire to mute the ringer whereas another public establishment may want to mute the ringer and prohibit conversation unless in a designated area. The present invention is less expensive for a business to implement and does not require approval by a regulating authority to use.

Therefore, the present invention provides an improved method, apparatus, and computer instructions for mitigating the mobile phone nuisance factor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the illustrations of uses for the mechanism of the present invention are show with respect to public establishments. The mechanism of the present invention may be used in any area or situation in which normal mobile phone or other mobile communications device operations are undesirable. The mechanism of the present invention may be applied to other mobile communications devices, such as a PDA, a laptop computer, or a two-way pager. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a mobile communications device for activating a profile, the method comprising:
    detecting an external control signal transmitted from a transmitter in a location, wherein the external control signal contains an encoded command;
    decoding the encoded command to define features in the profile, wherein the features are identified by a group of settings contained in the encoded command and wherein the features were not defined in the profile prior to detecting the external control signal;
    activating the profile, wherein the features in the profile control attributes of the mobile communication device, and wherein the profile implements a policy of mobile communications device usage for the location and replaces a current profile for the mobile communications device; and
    maintaining the profile only while the external control signal continues to be detected.

2. The method of claim 1 further comprising:
    restoring the current profile when reception of the external control signal is discontinued.

3. The method of claim 1, wherein the attributes disable a call from being received by a user of the mobile communications device.

4. The method of claim 1, wherein the attributes are at least one of a ringer mode, a ringer volume, a rinser duration, a vibration mode, a conversation mode, a conversation duration, and an informational message, and wherein the conversation mode enables or disables a call from being received by a user, the ringer mode turns a ringer on or off, and the vibration mode turns a vibration on or off.

5. The method of claim 1, wherein the profile cannot be activated or modified by a user of the mobile communications device.

6. A method in a mobile communications device for activating a profile when the mobile communications device is located in a location with a policy for mobile communications device usage, the method comprising:
    detecting an external control signal in the location, wherein the external control signal contains an encoded command that identifies settings for the mobile communications device;
    identifying the settings in the external control signal to form identified settings, wherein the identified settings define features in the profile that comply with the policy for mobile communications device usage for the location;
    activating the profile with the identified to settings to form active profile, wherein the features in the profile control attributes of the mobile communications device and were not defined in the profile prior to detecting the external control signal; and
    maintaining the active profile while the external control signal is detected.

7. The method of claim 6, wherein a prior profile is deactivated when the profile is activated and further comprising:
    restoring the prior profile when an absence of the external control signal is detected.

8. The method of claim 6 further comprising:
    displaying an icon indicating that the profile has been activated, wherein the icon is displayed while the profile is active.

9. The method of claim 6, wherein the location is a public establishment, a home, an office, or a government building.

10. The method of claim 6, wherein the external control signal is broadcasted from a transmitter.

11. The method of claim 10, wherein the transmitter is programmed by a control unit to broadcast the external control signal.

12. The method of claim 6, wherein the mobile communications device contains circuitry that decodes the external control signal.

13. The method of claim 6, wherein the attributes are at least one of a ringer mode, a ringer volume, a ringer duration, a vibration mode, conversation mode, conversation duration, and informational messages, and wherein the conversation mode enables or disables a call from being received by the user, the ringer mode turns a ringer on or off, and the vibration mode turns a vibration on or off.

14. The method of claim 6, wherein the mobile communications device is one of a mobile phone, a personal digital assistant, a two way pager, or a laptop computer.

15. The method of claim 6, wherein the external control signal is one of a radio frequency signal, an infrared signal, or an ultrasonic signal.

16. The method of claim 6, wherein an emergency phone call is always allowed by the profile.

17. The method of claim 6, wherein the profile cannot be activated or modified by a user of the mobile communications device.

18. A mobile communications device comprising:
a bus system;
a communications unit connected to the bus system; a memory connected to the bus system, wherein the memory includes as set of instructions; and
a processing unit connected to the bus system, wherein the processing unit executes the set of instructions to detect an external control signal transmitted from a transmitter in a location, wherein the external control signal contains an encoded command; decode the encoded command to define features in a profile, wherein the features are identified by a group of settings contained in the encoded command and wherein the features were not defined in the profile prior to detecting the external control signal; activate the profile, wherein the features in the profile control attributes of the mobile communication device, and wherein the profile implements a policy of mobile communications device usage for the location and replaces a current profile for the mobile communications device; and maintain the profile only while the external control signal continues to be detected.

19. A mobile communications device comprising:
a bus system;
a communications unit connected to the bus system; a memory connected to the bus system, wherein the memory includes as set of instructions; and
a processing unit connected to the bus system, wherein the processing unit executes the set of instructions to detect an external control signal in a location, wherein the external control signal contains an encoded command that identifies settings for a mobile communications device; identify the settings in the external control signal to form identified settings, wherein the identified settings define features in a profile that comply with a policy for mobile communications device usage for the location; activate the profile with the identified settings to form an active profile, wherein the features in the profile control attributes of the mobile communications device and were not defined in the profile prior to detecting the external control signal; and maintain the active profile while the external control signal is detected.

20. A mobile communications device for activating a profile, the mobile communications device comprising:
detecting means for detecting an external control signal transmitted from a transmitter in a location, wherein the external control signals contains an encoded command;
decoding means for decoding the encoded command to define features in the profile, wherein the features are identified by a group of settings contained in the encoded command and wherein the features were not defined in the profile prior to detecting the external control signal;
activating means for activating the profile, wherein the features in the profile control attributes of the mobile communication device, and wherein the profile implements a policy of mobile communications device usage for the location and replaces a current profile for the mobile communications device; and
maintaining means for maintaining the profile only while the external control signal continues to be detected.

21. A mobile communications device for activating a profile when the mobile communications device is located in a location with a policy for mobile communications device usage, the mobile communications device comprising:
detecting means for detecting an external control signal in the location, wherein the external control signal contains an encoded command that identifies settings for the mobile communications device;
identifying means for identifying the settings in the external control signal to form identified settings, wherein the identified settings define features in the profile that comply with the policy for mobile communications device usage for the location;
activating means for activating the profile with the identified settings to form an active profile, wherein the features in the profile control attributes of the mobile communications device and were not defined in the profile prior to detecting the external control signal; and
maintaining means for maintaining the active profile while the external control signal is detected.

22. A computer program product in a computer readable medium for activating a profile, the computer program product comprising:
first instructions for detecting an external control signal transmitted from a transmitter in a location, wherein the external control signal contains an encoded command;
second instructions for decoding the encoded command to define features in the profile, wherein the features are identified by a group of settings contained in the encoded command and wherein the features were not defined in the profile prior to detecting the external control signal;
third instructions for activating the profile, wherein the features in the profile control attributes of the mobile communication device, and wherein the profile implements a policy of mobile communications device usage for the location and replaces a current profile for the mobile communications device; and
fourth instructions for maintaining the profile only while the external control signal continues to be detected.

23. A computer program product in a computer readable medium for activating a profile when a mobile communications device is located in a location with a policy for mobile communications device usage, the computer program product comprising:
first instructions for detecting an external control signal in the location, wherein the external control signal contains encoded command that identifies settings for the mobile communications device;
second instructions for identifying the settings in the external control signal to form identified settings, wherein the identified settings define features in the profile that comply with the policy for mobile communications device usage for the location;
third instructions for activating the profile with the identified settings to form an active profile, wherein the features in the profile control attributes of the mobile communications device and were not defined in the profile prior to detecting the external control signal; and
fourth instructions for maintaining the active profile while the external control signal is detected.

* * * * *

UNITED STATES PATENT AND TRADEMARK OFFICE
CERTIFICATE OF CORRECTION

PATENT NO. : 7,006,817 B2
DATED : February 28, 2006
INVENTOR(S) : Awada et al.

It is certified that error appears in the above-identified patent and that said Letters Patent is hereby corrected as shown below:

Column 8,
Line 10, before "duration" delete "rinser" and insert -- ringer --.
Line 32, after "identified" delete "to".
Line 33, before "active" insert -- an --.

Column 10,
Line 52, before "encoded" insert -- an --.

Signed and Sealed this

Thirtieth Day of May, 2006

JON W. DUDAS
*Director of the United States Patent and Trademark Office*